(12) United States Patent
Peterson et al.

(10) Patent No.: US 9,705,160 B2
(45) Date of Patent: Jul. 11, 2017

(54) MOISTURE RESISTANT ENERGY STORAGE DEVICES AND ASSOCIATED METHODS

(71) Applicant: HzO, Inc., Draper, UT (US)

(72) Inventors: Rick C. Peterson, Draper, UT (US); Max Sorenson, Cottonwood Heights, UT (US)

(73) Assignee: HZO, Inc., Draper, UT (US)

( * ) Notice: Subject to any disclaimer, the term of this patent is extended or adjusted under 35 U.S.C. 154(b) by 782 days.

(21) Appl. No.: 13/920,576

(22) Filed: Jun. 18, 2013

(65) Prior Publication Data

US 2013/0337292 A1    Dec. 19, 2013

Related U.S. Application Data

(60) Provisional application No. 61/660,827, filed on Jun. 18, 2012.

(51) Int. Cl.
*H01M 10/42* (2006.01)
*H01M 2/10* (2006.01)

(52) U.S. Cl.
CPC ....... *H01M 10/425* (2013.01); *H01M 2/1094* (2013.01); *Y10T 29/49115* (2015.01)

(58) Field of Classification Search
CPC ...................................................... H01M 2/34
See application file for complete search history.

(56) References Cited

U.S. PATENT DOCUMENTS

| | | |
|---|---|---|
| 5,355,089 A | 10/1994 | Treger |
| 5,607,789 A | 3/1997 | Treger et al. |
| 6,380,487 B1 | 4/2002 | Hollenbeck et al. |
| 6,524,739 B1 | 2/2003 | Iwaizono et al. |
| 7,297,440 B2 | 11/2007 | Watanabe et al. |
| 2005/0151514 A1* | 7/2005 | Kozu .................. H01M 2/0404 320/147 |
| 2006/0057458 A1 | 3/2006 | O'Dea et al. |
| 2007/0251083 A1 | 11/2007 | Link et al. |
| 2009/0263581 A1 | 10/2009 | Martin, III et al. |
| 2009/0263641 A1 | 10/2009 | Martin, III et al. |
| 2009/0304549 A1 | 12/2009 | Coulson |

(Continued)

FOREIGN PATENT DOCUMENTS

| | | |
|---|---|---|
| JP | 2006-516796 | 7/2006 |
| KR | 1999-0006529 | 1/1999 |

(Continued)

OTHER PUBLICATIONS

United States Patent and Trademark Office, "International Search Report and Written Opinion," mailed Nov. 5, 2013, in related PCT application No. PCT/US2013/046308.

*Primary Examiner* — Stephan Essex
(74) *Attorney, Agent, or Firm* — Kunzler Law Group (57) ABSTRACT

The disclosure extends to moisture resistant energy storage devices, such as rechargeable batteries, and associated methods of forming the same. An energy storage device, such as a rechargeable battery, may comprise a cell including at least one electrical terminal and a circuit board electrically coupled to the at least one electrical terminal. The rechargeable battery may also include a moisture resistant coating on at least a portion of at least one of a surface of the cell and a surface of the circuit board. A moisture resistant coating may reside between the circuit board and the cell.

13 Claims, 4 Drawing Sheets

(56) References Cited

U.S. PATENT DOCUMENTS

| | | | |
|---|---|---|---|
| 2010/0151280 A1* | 6/2010 | Koh | .................... H01M 2/0404 429/7 |
| 2010/0203347 A1 | 8/2010 | Coulson | |
| 2010/0293812 A1 | 11/2010 | Coulson | |
| 2011/0262740 A1 | 10/2011 | Martin, III et al. | |

FOREIGN PATENT DOCUMENTS

| | | |
|---|---|---|
| KR | 2004-0085178 A | 10/2004 |
| KR | 2004-0103940 A | 12/2004 |
| KR | 0586124 | 6/2006 |
| KR | 2007-0015590 A | 2/2007 |
| KR | 2011-0063299 A | 6/2011 |
| WO | 98/31059 A1 | 7/1998 |

* cited by examiner

MOISTURE RESISTANT ENERGY STORAGE DEVICES AND ASSOCIATED METHODS

CROSS-REFERENCE TO RELATED APPLICATION

A claim for the benefit of priority to the Jun. 18, 2012 filing date of U.S. Provisional Patent Application 61/660, 827, titled WATER RESISTANT BATTERIES AND ASSOCIATED METHODS ("the '827 Provisional application"), is hereby made pursuant to 35 U.S.C. §119(e). The entire disclosures of the '827 Provisional application are, by this reference, incorporated herein.

TECHNICAL FIELD

This disclosure relates generally to energy storage devices, such as rechargeable batteries, fuel cells, ultra capacitors, supercapacitors, electrochemical capacitors, battery/capacitor hybrids, zinc air batteries and the like and, more specifically, to energy storage devices with protective coatings, including, without limitation, moisture resistant coatings.

SUMMARY

The teachings of this disclosure relate generally to methods for making devices that store electrical energy resistant to moisture, as well as to moisture-resistant devices for storing electrical energy. While the foregoing description refers specifically to rechargeable batteries and various components of rechargeable batteries, teachings of this disclosure are also applicable to other types of devices that store electrical energy (e.g., fuel cells, ultra capacitors, supercapacitors, electrochemical capacitors, battery/capacitor hybrids, zinc air batteries, etc.). Such devices are referred to herein as "energy storage devices" and "batteries"; both of these terms, as used herein, encompass conventional batteries, as well as all other types of devices that store electrical energy.

Methods and energy storage devices that incorporate teachings of this disclosure may include one or more protective coatings, including, but not limited to, moisture resistant coatings. As used herein, the term "protective coating" includes moisture resistant coatings or films, as well as other coatings or films that protect various parts of an electronic assembly from moisture and/or other external influences. While the term "moisture resistant coating" is used throughout this disclosure, in many, if not all, circumstances, a moisture resistant coating may comprise or be substituted with a protective coating that protects coated components and/or features from other external influences.

The term "moisture resistant" refers to the ability of a coating to prevent exposure of a coated element or feature to moisture. A moisture resistant coating may resist wetting or penetration by one or more types of moisture, or it may be impermeable or substantially impermeable to one or more types of moisture. A moisture resistant coating may repel one or more types of moisture. In some embodiments, a moisture resistant coating may be impermeable to, substantially impermeable to or repel water, an aqueous solution (e.g., salt solutions, acidic solutions, basic solutions, drinks, etc.) or vapors of water or other aqueous materials (e.g., humidity, fogs, mists, etc.), wetness, etc.). Use of the term "moisture resistant" to modify the term "coating" should not be considered to limit the scope of materials from which the coating protects one or more components of an electronic device. The term "moisture resistant" may also refer to the ability of a coating to restrict permeation of or repel organic liquids or vapors (e.g., organic solvents, other organic materials in liquid or vapor form, etc.), as well a variety of other substances or conditions that might pose a threat to an electronic device or its components. Various aspects relating to the use of masks in the application of protective coatings are disclosed.

According to one embodiment of an energy storage device, a rechargeable battery, comprises a cell. The cell may be bare or wrapped, coated or otherwise covered. In addition to the cell, the rechargeable battery may also include at least one electrical terminal and a circuit board (e.g., for surge protection, monitoring, control, etc.) electrically coupled to the at least one electrical terminal. The rechargeable battery may also include a moisture-resistant coating over at least a portion of at least one of a surface of the circuit board and/or a component carried by the circuit board to prevent moisture from contacting each coated feature. Optionally, a moisture-resistant coating may cover at least a portion of at least one surface of the cell.

Another embodiment of an energy storage device may include a cell of a rechargeable battery. The cell may comprise a cap plate that forms a first surface. The cap plate may be made of the same material of either the anode or the cathode, or a different material. The cell may further include an electrical terminal exposed through the first surface of the cap plate and configured to electrically couple to a protective circuit board. Furthermore, the cell may include a moisture resistant coating on at least a portion of the first surface of the cap plate.

In another aspect, a protective circuit board of an energy storage device may include a first surface with an exposed electrical terminal configured for electrically coupling to a cell. The protective circuit board may further include a moisture resistant coating on at least a portion of the first surface. The coating may have a relatively low dielectric constant and may not store or retain a significant charge.

In some embodiments, combinations of features, and even combinations of electrically coupled assemblies may be coated with one or more protective coatings. For example, a battery assembly may comprise a cell and a circuit board, one or both of which may be at least partially coated with a moisture resistant coating. In some embodiments, a moisture resistant coating, or a portion thereof, may reside between the cell and the circuit board. Regardless of where the moisture resistant coating or coatings are located, the circuit board may be in electrical communication with at least one electrical terminal of the cell.

Another aspect of this disclosure may include a method for assembling an energy storage device, such as a rechargeable battery. The method may include applying a first moisture resistant coating to at least a portion of a surface of a cell of a rechargeable battery with a first electrical terminal. The method may further include applying a second moisture resistant coating to at least a portion of a surface of a circuit board that includes a second electrical terminal. Further, after applying the first and second moisture resistant coatings, the method may include electrically coupling the first electrical terminal to the second electrical terminal. Further moisture resistant coatings may be applied after the energy storage device has been assembled; such a moisture resistant coating may, for example, cover contacts of the battery (e.g., electrically conductive elements coupling the cell to the circuit board, etc.).

In yet another aspect, a method for assembling a rechargeable battery may include electrically coupling a cell to a circuit board to form an energy storage assembly (e.g., a battery assembly, etc.). Additionally, the method may include applying a moisture resistant coating and/or another protective coating to at least a portion of a surface of the battery assembly, wherein the circuit board includes at least one exposed electrical contact.

Other aspects, as well as features and advantages of various aspects, of the disclosed subject matter will become apparent to those of skill in the art though consideration of the ensuing description, the accompanying drawings and the appended claims.

DETAILED DESCRIPTION

As will be appreciated by a person having ordinary skill in the art, one or more energy storage devices, such as one or more rechargeable batteries, may be used in a variety of different types of devices. Without limitation, energy storage devices may be used in electronic devices, such as portable electronic devices. Further, energy storage devices may include electric vehicle batteries used in automobiles or any other machinery. Some more specific examples of portable electronic devices with which one or more energy storage devices may be used include, but are not limited to, laptop computers, so-called "mobile" electronic devices (e.g., cellular telephones, smart phones, mobile computing devices (e.g., so-called "tablet" computing devices, etc.), digital media players, personal digital assistant (PDA) devices, etc.), cameras, portable electronic accessories (e.g., wireless headphones, wireless headsets, mobile speakers, wireless keyboards, wireless mice, etc.), and a variety of other portable electronic devices. Energy storage devices according to this disclosure may also be used with a wide variety of other products, some non-limiting examples of which include electric vehicles and equipment, gaselectric (or other types of) hybrid vehicles and equipment, power tools, gardening tools, exercise equipment and toys. A few non-limiting examples of rechargeable batteries include lithium-ion batteries, lithium-ion polymer batteries, nickel-cadmium batteries, nickel-metal hydride batteries, super capacitors, ultra capacitors, electrochemical capacitors, battery/capacitor hybrids, fuel cells, and zinc air batteries. Although this disclosure focuses on embodiments of energy storage devices that comprise lithium-ion batteries, the teachings of this disclosure are broadly applicable to a variety of different types of energy storage devices. Rather, embodiments of various elements of the disclosed subject matter may include any known and suitable rechargeable battery, as well as any other type of portable energy storage device.

According to various embodiments, an energy storage device may include a cell and a circuit board, as well as a moisture resistant coating over at least a portion of one or both of the cell and the circuit board. More specifically, for example, an energy storage device may include a moisture resistant coating on part or all of the circuit board and the cell. Even more specifically, the moisture resistant coating may prevent moisture from contacting electrical couplings between the cell and the circuit board. A moisture resistant coating may limit or prevent exposure of other electrical components of one or both of the circuit board and the cell to moisture.

Figure 1:
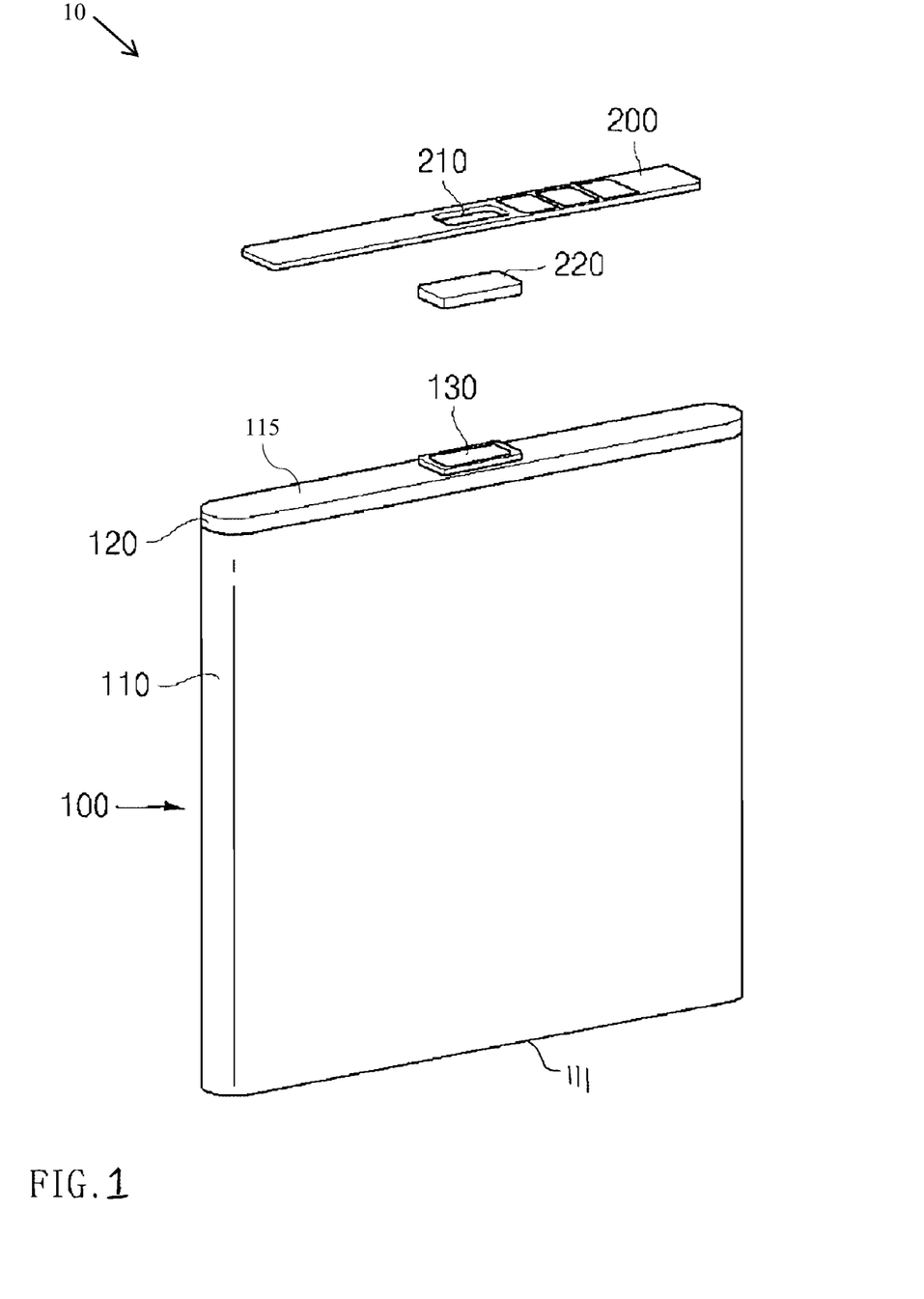
FIG. 1 is a perspective view of an energy storage device, comprising a cell and a circuit board of a rechargeable battery.
Figure 2A:
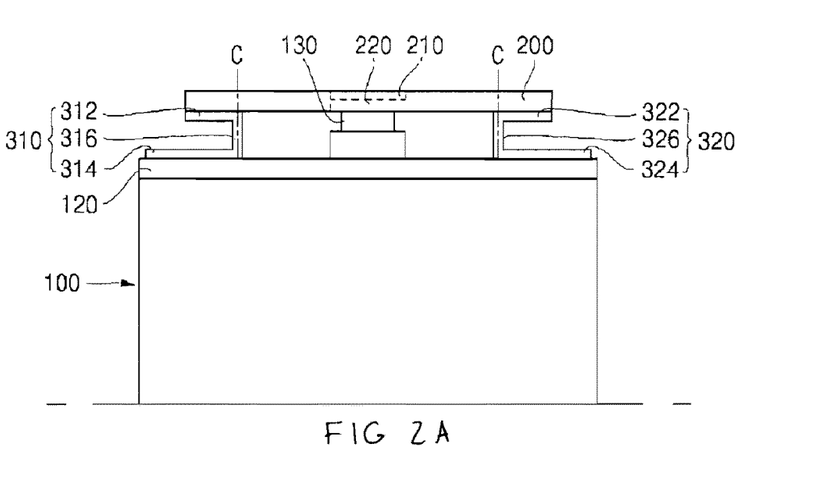
FIG. 2A is a side view of an embodiment of an energy storage device, comprising a rechargeable battery including a cell and a circuit board.

FIG. 1 is an exploded perspective view illustrating a cell and a circuit board of an embodiment of energy storage device that comprises a conventional rechargeable battery 10. FIG. 2A is a side view illustrating the conventional rechargeable battery 10. Referring to FIGS. 1 and 2A, the rechargeable battery 10 includes a cell 100 and a circuit board 200 configured to be positioned proximate to an upper surface of the cell 100. Further, the rechargeable battery 10 includes lead plates 310 and 320 (see FIG. 2A) disposed between the circuit board 200 and the cell 100 so as to electrically couple the circuit board 200 to the cell 100. As illustrated, lead plate 310 may include portions 312, 314, and 316, and lead plate 320 may include portions 322, 324, and 326. As will be appreciated by a person having ordinary skill in the art, the rechargeable battery 10 may also include an upper cover (not shown) installed so as to cover a surface 115 of the cell 100 that faces the circuit board, which may also be referred to as an "upper surface" of the cell 100, while surrounding the circuit board 200 and fixing the circuit board 200 to surface 115 of cell 100 adjacent to the circuit board 200. In addition, the rechargeable battery 10 may include a lower cover (not shown) fixed to another surface 111 of the cell 100, which surface 111 is opposite from surface 115 and faces away from the circuit board 200, as well as a label sheet (not shown) wrapped or wound about the cell 100.

As will be further appreciated, the cell 100 of the rechargeable battery 10 includes an electrode assembly (not shown), which may be comprised of a cathode plate, a separator, and an anode plate, a can 110 to contain the electrode assembly and an electrolytic solution, a cap assembly (not shown) including a cap plate 120 sealing an opening part of the can 110, and an electrode terminal 130 that extends through cap plate 120 to connect the electrode assembly to an electrical terminal 220 of the circuit board 200.

A hole 210 may extend through the circuit board 200 at a location that corresponds to a position where the electrode terminal 130 of the cell 100 is provided. The electrode terminal 130 is connected to an electrical terminal 220 through the hole 210 of the circuit board 200. By way of example only, electrode terminal 130 may be connected to electrical terminal 220 via laser welding, wire bonding, soldering, or any other known and suitable manner (e.g., mechanical attachment). Lead plates 310 and 320 are installed at both ends of the cap plate 120 of the cell 100. The lead plates 310 and 320 electrically couple the circuit board 200 to the cell 100. It is noted that lead plates 310 and 320 may be electrically isolated from others components of battery, if needed, to prevent undesired interference. It is further noted that the cell 100 may include another electrical terminal (not shown) that extends through surface 111 of the cell 100, opposite from the cap plate 120. The electrical terminal 130 may extend through surface 111 and connect the electrode assembly to an electrical terminal (not shown) of the circuit board 200 via lead plate 310 or lead plate 320.

Figure 2B:
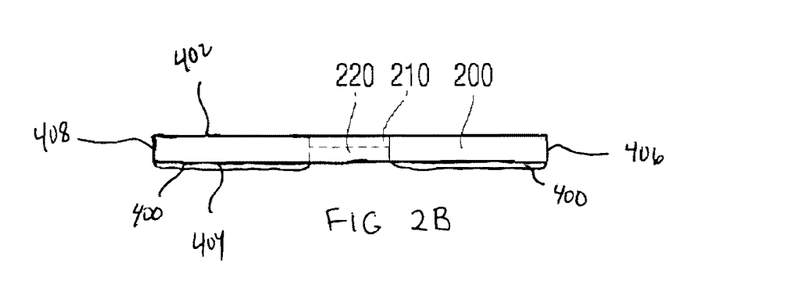
FIG. 2B is a side view of an embodiment of a circuit board with a moisture resistant coating on a surface thereof.

In FIG. 2B, the circuit board 200 is illustrated in greater detail. The circuit board 200 includes a first surface 402 and a second surface 404 opposite from the first surface 402. The circuit board 200 also includes a surface 406 adjacent to each of surface 402, as well as peripheral edges 404 and 408, which are located between and adjacent to surface 402 and surface 404. The location of the hole 210 through the circuit board 200 corresponds to a position where an electrical terminal (e.g., electrical terminal 130) of a cell (e.g., the cell 100) may be positioned. The electrode terminal 130 may be electrically coupled to the electrical terminal 220 of the circuit board 200. As illustrated in FIG. 2B, a moisture resistant coating 400, which is conformal, is disposed on at least a portion of surface 404. It is noted that according to one embodiment, a mask or coating release element may be applied to the electrical terminal 220 prior to a process of disposing moisture resistant coating 400 on the circuit board 200. The mask or coating release element (e.g., a film or structure to which the material of the moisture resistant coating 400 will not adhere, etc.) and/or a portion of the moisture resistant coating 400 may then be removed to expose the electrical terminal 220 and, thus, enable it to be electrically coupled to another terminal. It is noted that a mask or coating release element may be applied to any part of the circuit board 200 that could be adversely affected by a moisture resistant coating. According to another embodiment, after the moisture resistant coating 400 has been formed or otherwise disposed on surface 404, including electrical terminal 220, the moisture resistant coating 400 may be etched or otherwise removed from the electrical terminal 220 to expose the electrical terminal 220 for electrically coupling to another terminal, or to expose any other feature of the circuit board 200.

Figure 2C:
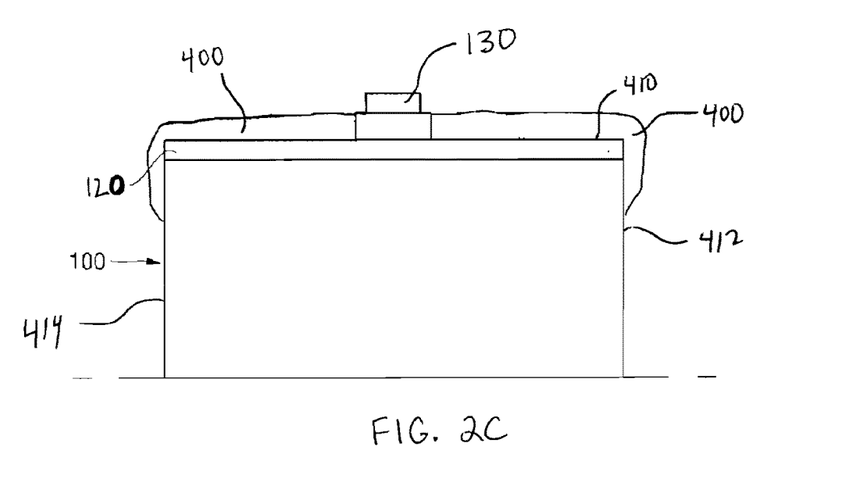
FIG. 2C is a side view an embodiment of a cell with a moisture resistant coating on a surface thereof.

FIG. 2C illustrates the cell 100, including the electrical terminal 130 and the cap plate 120, which has a surface 410. Further, a moisture resistant coating 400 is disposed on at least a portion of the surface 410 of the cell 100. Further, as illustrated in FIG. 2C, the moisture resistant coating 400 may be disposed on part(s) or all of one or more peripheral edges 412, 414 of the cell 100, which may be adjacent to and oriented at an angle from the surface 410. It is noted that according to one embodiment, a mask or coating release element may be applied to the electrical terminal 130 prior to a process of disposing moisture resistant coating 400 on the cell 100. The mask, coating release element and/or a portion of the moisture resistant coating 400 may then be removed to expose the electrical terminal 130 for electrical coupling to another terminal (e.g., the electrical terminal 220 of the circuit board 200). It is noted that a mask or a coating release element may be applied to any part of the cell 100 that could be adversely affected by a moisture resistant coating. According to another embodiment, after the moisture resistant coating 400 has been formed or otherwise disposed on the surface 404, including over the electrical terminal 130, part(s) of the moisture resistant coating 400 may be etched or otherwise removed from electrical terminal 130 to expose electrical terminal 130 for electrical coupling to another terminal.

Optionally, the rechargeable energy storage element may be fully installed in the portable electronic device during coating, such that a close mechanical fit between the cap plate and the electrical terminals effectively insures a moisture barrier.

The rechargeable energy storage element may be coated while attached to a dummy cap plate, so that after separation from the dummy cap plate, the electrically conducting portion of the electrical terminal of the rechargeable energy storage element is of a size designed to mate precisely with the conducting surface of an actual cap plate, or alternately, has been designed to be slightly smaller than the conducting surface of an actual cap plate, thereby providing a rim and defacto minigasket at the terminal cap plate junction.

In an alternate embodiment, the cap plate may be coated while attached to a dummy electrical terminal, so that after separation from the dummy electrical terminal, the conducting portion of the cap plate is of a size designed to mate precisely with an actual electrical terminal, or alternately, has been designed to be slightly smaller than the conducting surface of an actual terminal, thereby providing a defacto minigasket at the cap plate terminal junction.

With reference to FIGS. 2B and 2C, it is noted that the circuit board 200 may be coupled (e.g., electrically and physically) to the cell 100 after the moisture resistant coating 400 has been applied to the surface 404 of the circuit board 200, the surface 410 of the cell 100, or both. Stated another way, although the moisture resistant coating 400 may be positioned between the circuit board 200 and the cell 100, it is not required that the moisture resistant coating 400 be applied to both the circuit board 200 and the cell 100 prior to coupling the circuit board 200 to the cell 100.

Figure 2D:
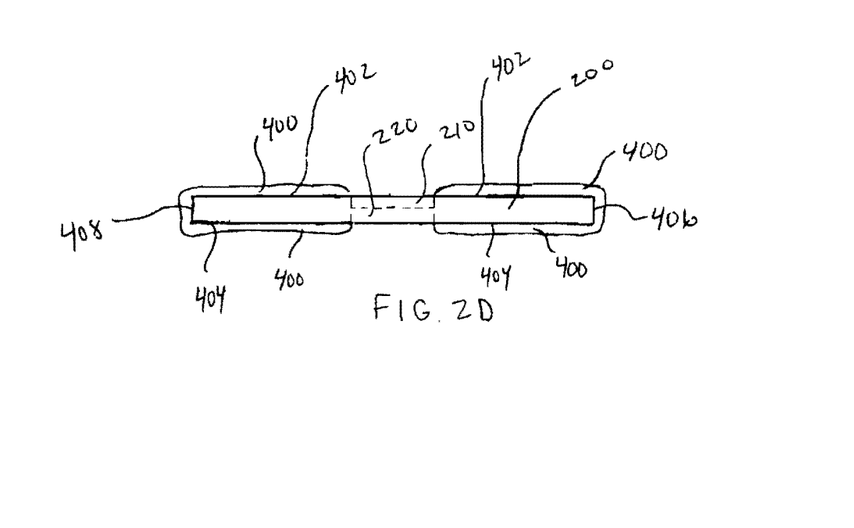
FIG. 2D is a side view of an embodiment of a circuit board with moisture resistant coatings on a plurality of surfaces thereof.

FIG. 2D illustrates the circuit board 200 with the moisture resistant coating 400 disposed on at least a portion of each of the surfaces 402 and 404 and the peripheral edges 406 and 408. As noted above with respect to FIG. 2B, according to one embodiment, a mask or coating release element may be applied to the electrical terminal 220 prior to a process of disposing a moisture resistant coating 400 on the circuit board 200. The mask or coating release element and/or one or more portions of the moisture resistant coating 400 may then be removed to expose the electrical terminal 220 for electrical coupling to another terminal. It is noted that a mask or coating release element may be applied to any part of the circuit board 200 that could be adversely affected by a moisture resistant coating. According to another embodiment, after the moisture resistant coating 400 has been formed or otherwise disposed on the surfaces 402 and 404, and on the electrical terminal 220, one or more portions of the moisture resistant coating 400 may be etched or otherwise removed from the electrical terminal 220 to expose the electrical terminal 220 for electrical coupling to another terminal. Further, a gel, such as an anti-corrosion gel may be applied to electrical terminal 220 prior to coupling electrical terminal 220 to another terminal (e.g., terminal 130 of cell 100). The gel, which does not solidify and, thus, may be displaced upon coupling electrical terminal 220 to another terminal, allows for repeated connection and disconnection of the two terminals.

Figure 2E:
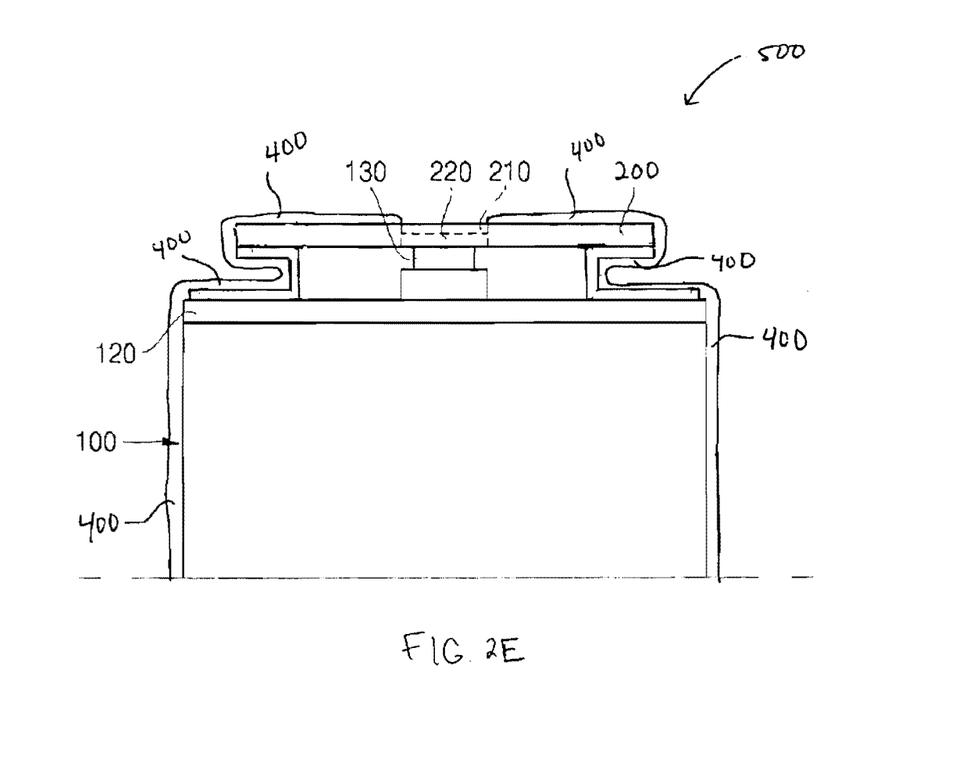
FIG. 2E is a side view of an embodiment of a rechargeable battery including a cell, a circuit board, and a moisture resistant coating covering a surface of the rechargeable battery.

FIG. 2E illustrates a battery assembly 500 including a cell 100 and a circuit board 200. Further, the battery assembly 500 includes lead plates 310 and 320 (see FIG. 2A) disposed between the circuit board 200 and the cell 100 to electrically couple the circuit board 200 to the cell 100. As illustrated in FIG. 2E, an electrode terminal 130 extends through a cap plate 120 and couples to an electrical terminal 220 of the circuit board 200. Further, the battery assembly 500 includes a moisture resistant coating 400 over at least a portion of the circuit board 200 and over at least a portion of the cell 100. Further, the moisture resistant coating 400 may cover at least a portion of each of the lead plates 310 and 320. It is noted that the electrical terminal 220 is exposed via a hole 210 through the circuit board 200 and, thus, may be electrically coupled to another terminal (e.g., a terminal of an electronic device). Moreover, although not illustrated in FIG. 2E, an interior surface of the battery assembly 500 may include a moisture resistant coating. More specifically, for example, a moisture resistant coating may exist between the circuit board 200 and the cell 100, such as described with reference to FIGS. 2B and 2C. According to one embodiment, an entire outer surface of the battery assembly 500, except for electrical terminals that are configured to electrically connect the battery assembly 500 to an external component (e.g., an electronic device, etc.), may have a moisture resistant coating 400 thereon. Further, after an external component is electrically connected to an electrical terminal of battery assembly 500, a moisture resistant coating may be applied to the connection. As a more specific example, after electrical terminals of battery assembly 500 are permanently wired to an external component, such as a circuit board, the battery assembly 500 including the electrical terminals may be coated with a resistant coating.

A mask or coating release element may be applied to the electrical terminal 220 prior to forming or otherwise disposing the moisture resistant coating 400 on the battery assembly 500. The mask or coating release element and/or one or more portions of the moisture resistant coating 400 may then be removed to expose the electrical terminal 220 for electrically coupling to another terminal. It is noted that a mask or coating release element may be applied to any part of the battery assembly 500 that could be adversely affected by a moisture resistant coating. According to another embodiment, after the moisture resistant coating 400 has been formed or otherwise disposed on one or more surfaces of the battery assembly 500, including on the electrical terminal 220, one or more portions of the moisture resistant coating 400 may be etched or otherwise removed from the electrical terminal 220 to expose the electrical terminal 220 for electrical coupling to another terminal.

With reference again to FIGS. 1 and 2A, as noted above, a cell 100 may include an electrical terminal (not shown) that extends through a surface 111 of the cell 100. The electrical terminal may connect the electrode assembly to an electrical terminal (not shown) of the circuit board 200 via lead plate 310 or lead plate 320. Accordingly, the electrical terminal may be exposed through a moisture resistant coating formed on the surface 111.

It is noted that FIGS. 1-2E are provided as a non-limiting example of a rechargeable battery and embodiments of the present disclosure may be applied to any known and suitable rechargeable battery. For example, although FIGS. 1-2E are directed to a cell including a single terminal on an upper surface (i.e., surface 115) and a single terminal on a lower surface (i.e., surface 111), the scope and applicability of the disclosed subject matter are not so limited. Rather, a cell may include any suitable numbers of terminals on each surface of a cell.

Figure 3A:
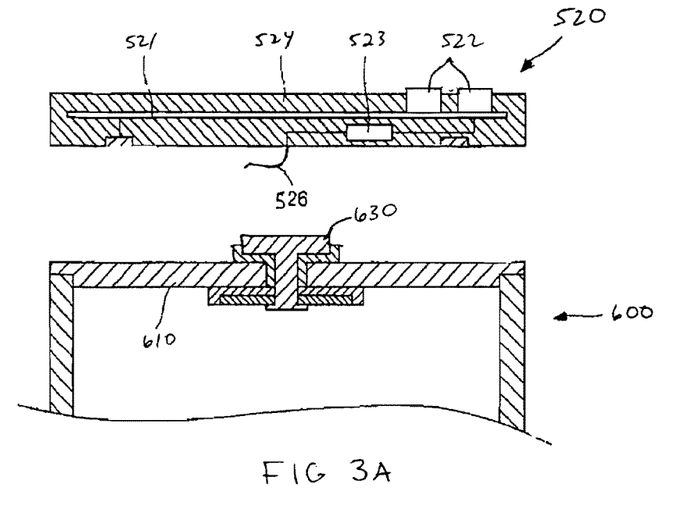
FIG. 3A is a side view of another embodiment of a rechargeable battery including a cell and a circuit board.

FIG. 3A is a schematic sectional view illustrating another example of a conventional rechargeable battery including a battery component part 520 and a cell 600. The battery component part 520 includes a circuit board 521 and a bimetal device 523 that are connected to each other in series through electric terminals, the protective circuit board 521 and the bimetal device 523 being encapsulated by a molding 524. The cell 600 includes a cap plate 610. A negative terminal 630 of the cell 600 is configured to protrude from cap plate 610 while being electrically insulated from the remaining parts of the cell 600. Meanwhile, in the battery component part 520, an electrode connection part 526, to which one electric terminal of the bimetal device 523 is connected, is formed by a multi-leaf spring. When the battery component part 520 is bonded to the cell 600, the multi-leaf spring is in contact with the terminal 630 of the cell 600 and causes deformation, thereby maintaining contact with the terminal 630. An electric terminal of the circuit board 521 and an electric terminal of the bimetal device 523 connect to connection leads (not shown) at the bottom surface of the battery component part 520. The connection leads are then electrically connected to the cap plate 610 of the cell 600 and the terminal 630, respectively.

Figure 3B:
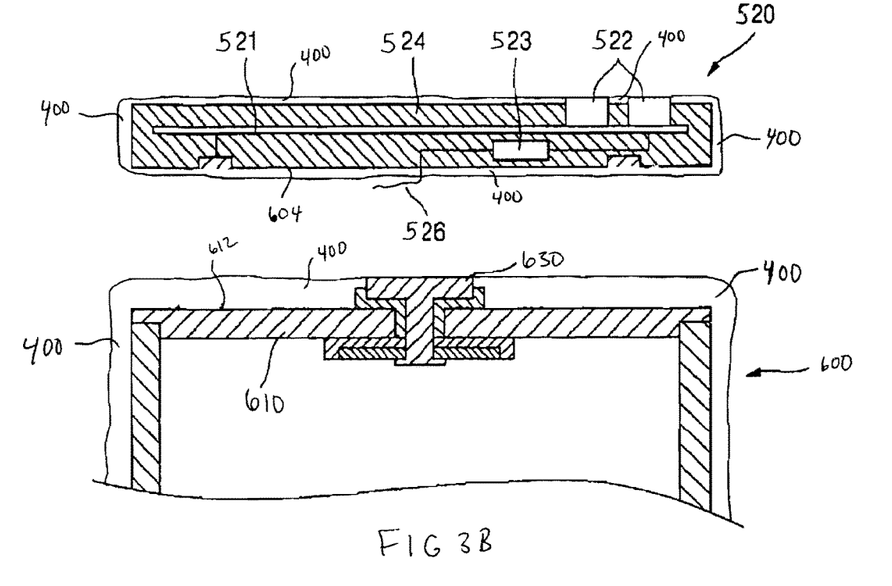
FIG. 3B is a side view of the embodiment of rechargeable battery of FIG. 3A, including a moisture resistant coating over a surface of the protective circuit board and another moisture resistant coating over a surface of the cell.

FIG. 3B illustrates a moisture resistant coating 400 over on an exterior surface of the component part 520 and an exterior surface of the cell 600. As illustrated in FIG. 3B, the terminal 630, the terminals 522, and the electrode connection part 526 are exposed through the moisture resistant coating 400. It is noted that although the moisture resistant coating 400 is illustrated as being disposed over substantially an entire exterior surface of the component part 520, the scope and applicability of the disclosed subject matter are not so limited. Rather, the moisture resistant coating 400 may be disposed on a portion of an exterior surface of the component part 520. Similarly, although moisture resistant coating 400 is illustrated as being disposed over substantially an entire exterior surface of the cell 600, the moisture resistant coating 400 may be disposed on a portion of an exterior surface of the cell 600.

According to one embodiment, a mask or coating release element may be applied to the electrode connection part 526, the electrical terminals 522, and the terminal 630 prior to forming or otherwise disposing the moisture resistant coating 400 on the component part 520 and the cell 600. The mask or coating release element and/or one or more portions of the moisture resistant coating 400 may then be removed to expose the electrode connection part 526, the terminals 522, and the terminal 630. It is noted that a mask or coating release element may be applied to any part of the component part 520 and the cell 600 that could be adversely affected by a moisture resistant coating. According to another embodiment, after moisture resistant coating 400 has been formed or otherwise disposed on the component part 520, including the electrode connection part 526 and the terminals 522, and on the cell 600, including the terminal 630, one or more portions of the moisture resistant coating 400 may be etched or otherwise removed from the electrode connection part 526, the terminals 522, and the terminals 630.

It is also noted that the protection component part 520 may be coupled (e.g., electrically and physically) to the cell 600 after the moisture resistant coating 400 has been applied to the surface 604 of the component part 520, the surface 612 of the cell 600, or both. Stated another way, although the moisture resistant coating 400 may be positioned between the component part 520 and the cell 600, it is not required that the moisture resistant coating 400 be applied to both the component part 520 and the cell 600 prior to coupling the component part 520 to the cell 600.

It is noted that the processes of defining moisture resistant coatings disclosed above (e.g., by masking, use of a coating release element, removing one or more portions of a moisture resistant coating, etc.) may be carried out by any known and suitable methods. Further, in some embodiments the moisture resistant coatings, as described herein, may vary physically (e.g., in thickness, in surface texture, etc.). Further, moisture resistant coatings may have different chemical properties (e.g., include different materials, comprise different types of moisture resistant coatings, impart moisture resistance in different ways (e.g., as a barrier, by imparting hydrophobicity, etc.), etc.) from one another. Other characteristics (e.g., transparency/opacity, thermal conductivity, etc.) may also vary in the moisture resistant coatings.

Any of a variety of metrics may be used to quantify the moisture resistance of each coating formed by an assembly system. For example, the ability of a coating to physically inhibit moisture from contacting a coated feature may be considered to impart the coating with moisture resistance.

As an example, the ability of a coating to prevent exposure of a coating component or feature to moisture may be based on more quantifiable data, such as the rate at which water permeates through the coating, or its water vapor transfer rate, which may be measured using known techniques in units of $g/m^2/day$ or in units of $g/100$ $in^2/day$ (e.g., less than 2 $g/100$ $in^2/day$, about 1.5 $g/100$ $in^2/day$ or less, about 1 $g/100$ $in^2/day$ or less, about 0.5 $g/100$ $in^2/day$ or less, about 0.25 $g/100$ $in^2/day$ or less, about 0.15 $g/100$ $in^2/day$ or less, etc., through a film having a thickness of about 1 mil (i.e., about 25.4 µm), at a temperature of 37° and at a relative humidity of 90%).

Another way in which the moisture resistance of a coating may be determined is its water contact angle when water is applied to a surface of the coating by an acceptable technique (e.g., the static sessile drop method, the dynamic sessile drop method, etc.). The hydrophobicity of the surface may be measured by determining the angle the base of a water droplet makes with the surface, from beneath a base of the water droplet; for example, using the Young equation, i.e.:

$$\theta_C = \arccos \frac{r_A \cos\theta_A + r_R \cos\theta_R}{r_A + r_R},$$

where $\theta_A$ is the highest, or advancing, contact angle; $\theta_R$ is the lowest, or receding, contact angle;

$$r_A = \sqrt[3]{\frac{\sin^3\theta_A}{2 - 3\cos\theta_A + \cos^3\theta_A}}; \text{ and } r_R = \sqrt[3]{\frac{\sin^3\theta_R}{2 - 3\cos\theta_R + \cos^3\theta_R}}.$$

If the surface is hydrophilic, the water will spread somewhat, forming a water contact angle of less than 90° with the surface. In contrast, a hydrophobic surface, which, for purposes of this disclosure, may be considered to be moisture resistant, will prevent the water from spreading, resulting in a water contact angle of 90° or greater. The more the water beads on a surface, the greater the water contact angle. When water droplets bead on a surface such that the water contact angle with the surface is about 120° or more, the surface is considered to be highly hydrophobic. When the angle at which water contacts a surface exceeds 150° (i.e., a water droplet on the surface is nearly spherical), the surface is said to be "superhydrophobic."

Of course, other measures of moisture resistance may also be employed.

Any of a variety of suitable materials, techniques and apparatus may be used to apply a moisture resistant coating to at least a portion of a subassembly or an assembly of electronic components. Without limitation, a moisture resistant coating 400 may be formed from reactive monomers, which monomers may then be deposited onto and form polymers on one or more surfaces that are to be made moisture resistant or moisture proof (e.g., waterproof, etc.). In specific embodiments, poly(p-xylylene) (i.e., Parylene), including unsubstituted and/or substituted units, may be deposited onto one or more surfaces that are to be rendered moisture resistant or moisture proof. Examples of processes for forming parylene coatings are described by U.S. patent application Ser. Nos. 12/104,080, 12/104,152 and 12/988,103, the entire disclosure of each of which is, by this reference, hereby incorporated herein. U.S. patent application Ser. Nos. 12/446,999, 12/669,074 and 12/740,119, the entire disclosures of all of which are, by this reference, hereby incorporated herein, disclose other embodiments of materials, techniques and equipment that may be used to form a moisture resistant coating 400. Other techniques that may be employed to form a moisture resistant coating 400 include, without limitation, physical application processes (e.g., printing, spraying, rolling, brushing, etc.), chemical vapor deposition (CVD) (e.g., plasma-enhanced CVD (PECVD), etc.), atomic layer deposition (ALD), pulsed plasma deposition (PPD), physical vapor deposition (PVD) (e.g., evaporation deposition processes (including, but not limited to e-beam evaporation, sputtering, laser ablation, pulsed laser deposition, etc.). Of course, other techniques may also be used to form a moisture resistant coating 400.

Materials that may be used to form a moisture resistant coating 400 include, but are certainly not limited to, thermoplastic materials, curable materials (e.g., radiation-curable materials, two-part materials, thermoset materials, room-temperature curable materials, etc.). Where appropriate, these materials may be hydrophobic (e.g., halogenated polymers, etc.). In some embodiments, a coating element may be configured to apply a moisture resistant film 30.

Although the foregoing description contains many specifics, these should not be construed as limiting the scope of any of the appended claims, but merely as providing information pertinent to some specific embodiments that may fall within the scopes of the appended claims. Features from different embodiments may be employed in combination. In addition, other embodiments may also be devised which lie within the scopes of the appended claims. The scope of each claim is, therefore, indicated and limited only by the plain language used in appended claims and the legal equivalents to the elements of the claims. All additions, deletions and modifications to the disclosed subject matter that fall within the meaning and scopes of the claims are to be embraced by the claims.

What is claimed:
1. An energy storage device, comprising:
   a cell including at least one electrical terminal;
   a circuit board electrically coupled to the at least one electrical terminal;
   an interconnect disposed between the cell and the circuit board; and
   a moisture resistant coating on at least a portion of at least one of a surface of the cell, a surface of the interconnect, and a surface of the circuit board;
      wherein the moisture resistant coating covers and is in contact with at least a portion of a first surface of the circuit board and at least a portion of a second opposite surface of the circuit board and peripheral edges of the circuit board.

2. The energy storage device of claim 1, wherein the moisture resistant coating is conformal.

3. The energy storage device of claim 1, where the moisture resistant coating creates a minigasket between the at least one electrical terminal and the at least one surface of the cell.

4. The energy storage device of claim 1, where the moisture resistant does not substantially store or retain charge.

5. The energy storage device of claim 1, wherein a mechanical compression holding the cell to the circuit board is greater than or equal to 30 Pa.

6. The energy storage device of claim 1, the moisture resistant coating comprises a poly(p-xylylene) polymer.

7. The energy storage device of claim 1, the moisture resistant coating covers at least a portion of a plurality of surfaces of the cell.

8. The energy storage device of claim 1, the moisture resistant coating has a substantially uniform thickness.

9. The energy storage device of claim 1, further comprising at least one lead plate coupling the cell to the circuit, the moisture resistant coating covering at least a portion of the at least one lead plate.

10. An assembly of an energy storage device, comprising:
a cell;
a circuit board in electrical contact with the cell;
an interconnect disposed between the cell and the circuit board; and
a moisture resistant coating disposed on at least a portion of the interconnect and positioned between the cell and the circuit board wherein the moisture resistant coating covers and is in contact with at least a portion of a first surface of the circuit board and at least a portion of a second opposite surface of the circuit board and peripheral edges of the circuit board.

11. The assembly of claim 10, the circuit board including at least one electrical contact exposed through the another moisture resistant coating.

12. The assembly of claim 10, the moisture resistant coating further positioned on at least one exterior surface of the assembly.

13. The assembly of claim 10, the moisture resistant coating further positioned on at least one interior surface of the assembly.

* * * * *